Feb. 19, 1963
E. H. VICKERY
3,078,065
BALL VALVE ACTUATOR
Filed May 12, 1961
3 Sheets-Sheet 1
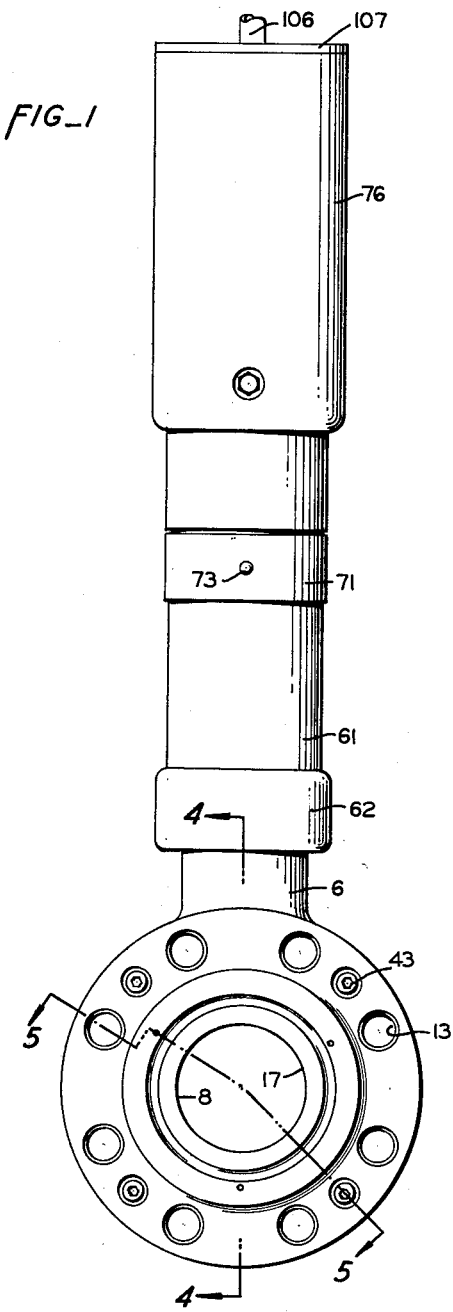
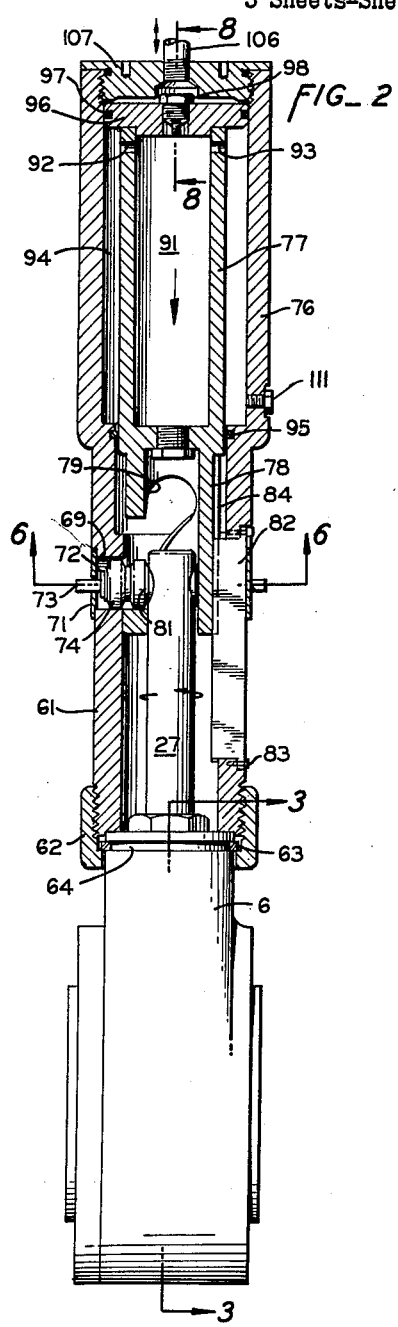
INVENTOR.
EDGAR HERBERT VICKERY
BY Lothrop & West
ATTORNEYS Feb. 19, 1963  E. H. VICKERY  3,078,065
BALL VALVE ACTUATOR
Filed May 12, 1961  3 Sheets-Sheet 2
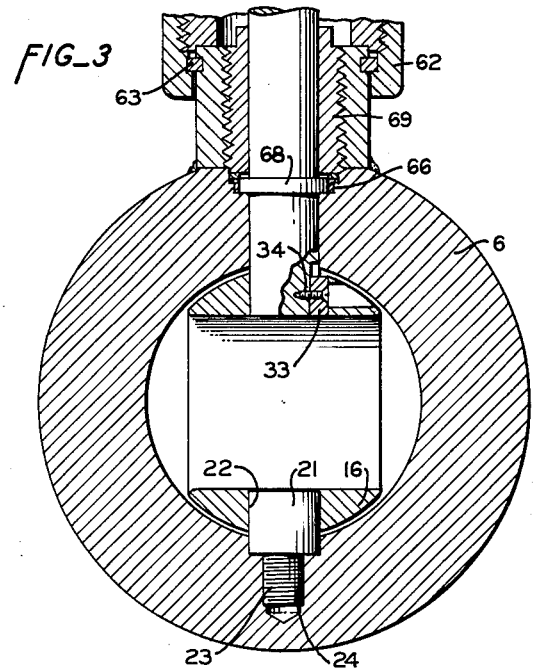
FIG_3
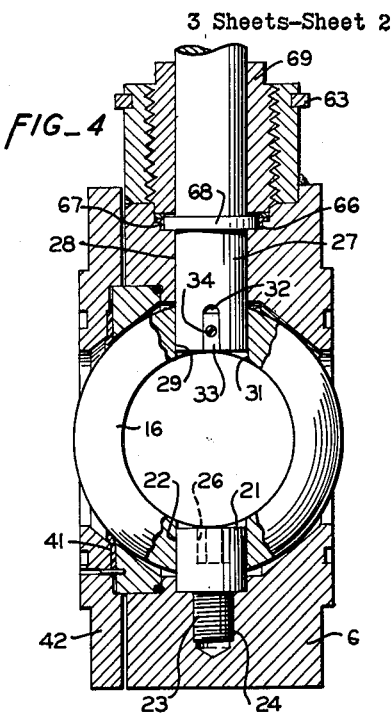
FIG_4
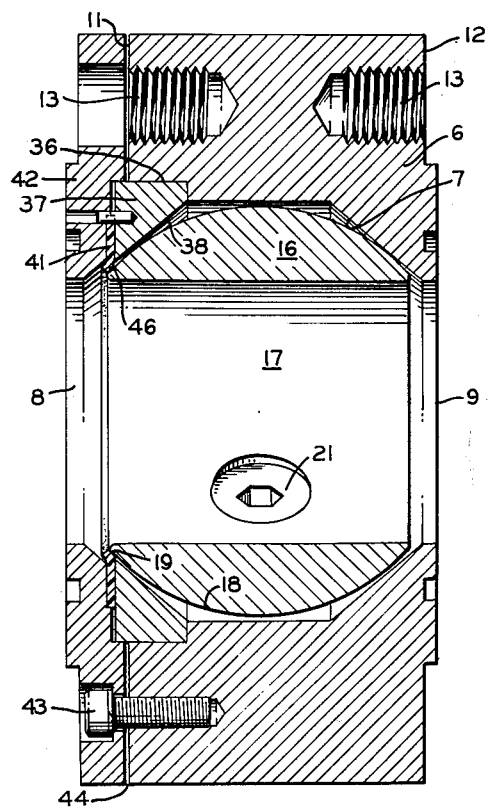
FIG_5
INVENTOR.
EDGAR HERBERT VICKERY
BY Lothrop & West
ATTORNEYS Feb. 19, 1963  E. H. VICKERY  3,078,065
BALL VALVE ACTUATOR
Filed May 12, 1961  3 Sheets-Sheet 3
FIG_6
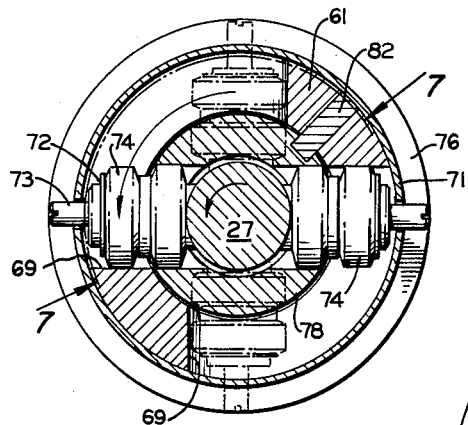
FIG_7
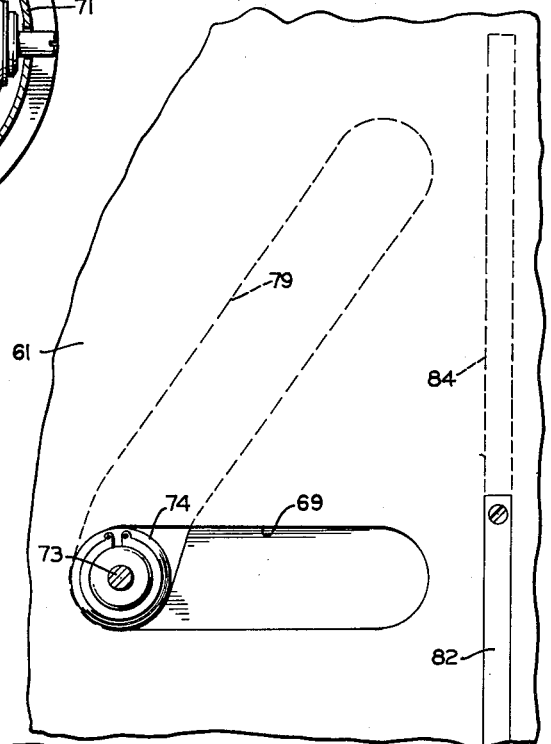
FIG_8
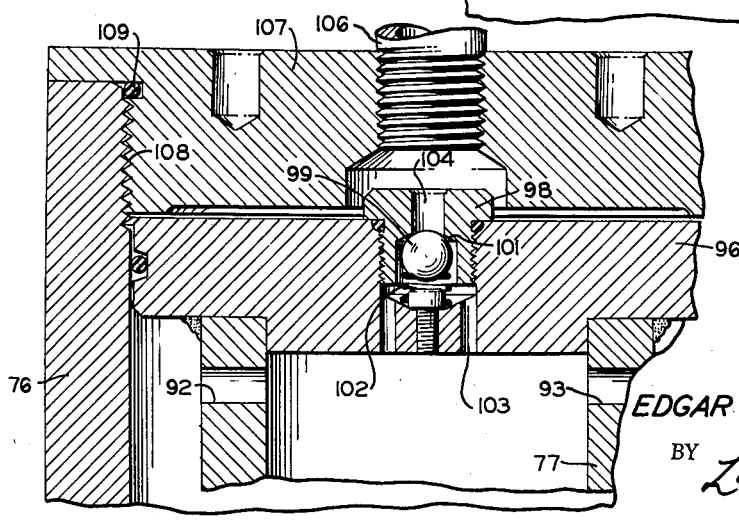
INVENTOR.
EDGAR HERBERT VICKERY
BY Lothrop & West
ATTORNEYS 3,078,065
      BALL VALVE ACTUATOR
Edgar Herbert Vickery, Oakland, Calif., assignor to
  Fisher Governor Company, a corporation of Iowa
        Filed May 12, 1961, Ser. No. 124,249
            5 Claims. (Cl. 251—58)

This invention relates to an actuator for ball valves used in fluid flow lines, and, in particular, to an actuator for a valve operated under extreme conditions of temperature and pressure.

This application is a continuation-in-part of patent application Serial No. 677,617, filed August 12, 1957, and now abandoned.

Recent technical developments in rocket and missile devices have made imperative the furnishing of control valves for various fluid materials which are operable under extreme conditions. In particular, valves are required for controlling and shutting off the supply of cryogenic fluids such as liquid oxygen, which is handled at a very low temperature and a very high pressure. The valve must be drop tight when closed yet afford full flow when open, and it must be very reliable in its operation.

Ball valve constructions which satisfy the foregoing requirements have been provided, such as disclosed hereinafter and described and claimed in my pending application Serial No. 109,671, filed May 12, 1961. Such constructions include a valve housing, a valve ball therein, and a ring seal between the ball and the housing. Under certain of the conditions of operation for which the valves are designed, the valves require considerable force for opening and closing, or additional measures are required for reducing the pressure of the seal on the valve ball, which is very substantial under the conditions of operation.

It is therefore an object of the invention to provide a ball valve actuator for operating a ball valve which is employed under extreme temperature and pressure conditions, and especially with exotic fluids such as liquid oxygen, liquid nitrogen, and helium gas.

A particular object is to provide an actuator for readily operating a sealed ball valve wherein the valve ball and seal are tightly engaged, and more particularly, an actuator which employs normal pressure fluid to regulate fluid flow through the valve.

Another object is to provide a ball valve and actuator adapted for use under the above conditions, and particularly, a self-contained valve and actuator which can be utilized as a unit.

An additional object is to provide an actuator construction which readily can be manufactured, assembled and disassembled.

These and other objects, advantages and functions of the invention will be apparent on reference to the specifications and to the attached drawings, illustrating a preferred embodiment of the invention, in which like parts are identified by like reference symbols in each of the views, and in which:

FIGURE 1 is an end elevational view of a ball valve and actuator in accordance with the invention;

FIGURE 2 is a side elevational view of the valve and a longitudinal cross-sectional view of the actuator taken on the vertical axis thereof;

FIGURE 3 is an enlarged transverse cross-sectional view of the ball valve with parts in elevation, taken on the axis of rotation of the valve ball and on the line 3—3 of FIGURE 2;

FIGURE 4 is a vertical longitudinal cross-sectional view of the ball valve, with parts in elevation and with the valve ball in closed position, taken along the axis of flow and on line 4—4 of FIGURE 1;

FIGURE 5 is a further enlarged longitudinal cross-sectional view of the ball valve, taken along the axis of flow and at an angle with respect to the plane of the section of FIGURE 4, and on lines 5—5 of FIGURE 1;

FIGURE 6 is a horizontal cross-sectional view of actuator parts, taken on line 6—6 of FIGURE 2;

FIGURE 7 is an enlarged development of part of the actuating mechanism shown in FIGURES 2 and 6, the developed surface being indicated by the broken lines and the arrows 7—7 of FIGURE 6; and FIGURE 8 is an enlarged cross-sectional view of the uppermost end of the actuator, taken on line 8—8 of FIGURE 2.

The particular problem with which this invention is concerned is to provide an actuator for turning a valve which is constructed to be drop tight under extreme conditions. Thus, valves as described herein operate under liquid oxygen at 1,000 lbs. per sq. in. pressure, under liquid nitrogen at 1,200 lbs. per sq. in., and under helium gas at 2,100 lbs. per sq. in. and minus 300° F. The actuator construction is also adapted for other applications.

Referring to the drawings, a preferred ball valve construction is illustrated, which preferably is constructed of metal parts, except for sealing members. The valve proper includes a metallic housing 6 having a valve cavity 7 therein establishing communication between axially aligned openings defining a flow passage, in particular, an inlet opening 8 and an outlet opening 9. The body is partly defined by a pair of transverse parallel faces 11 and 12 adjacent the inlet and outlet openings, respectively. The respective faces are provided with threaded recesses 13 for the reception of appropriate fastening devices (not shown) for securing the valve in a pipeline or comparable conduit.

A highly polished metallic valve ball, sphere, or rotor 16 is disposed within the valve cavity 7. The valve ball includes a central cylindrical flow passage or opening 17 therethrough of approximately the same diameter as the inlet and outlet openings 8 and 9, and adapted to register or align therewith in the open position of the valve. The valve is closed by rotating the valve ball 90 degrees, as illustrated in FIGURES 3 and 4. The valve ball has an outer surface 18 which is as nearly as possible spherical, with a slight radius 19 at the intersection of the surface with the flow passage 17, to avoid sharp edges.

The valve ball 16 is designed for rotation about an axis at right angles to the axis of the openings 8 and 9. This rotation is in part effected by a journal plug 21 inserted in the base of the valve ball, which serves as a bearing for the surface of a comparable plug opening 22 in the valve ball. The journal plug has an extension 23 that is threaded so that it can be screwed into a threaded recess 24 in the base of the valve housing 6. The length and the diameter of the journal plug 36 are such that this plug can be introduced into its proper position through the inlet opening 8, for example, into the flow passage 17. It can then be dropped in an axial direction through the opening 22 and threaded into the recess 24 to form a firm support and journal mounting for the valve ball 16. To assist in turning and tightening the journal plug, suitable wrench receiving surfaces 26 are provided therein. This construction is described and claimed in my co-pending application Serial No. 109,672, filed May 12, 1961.

A valve stem 27 is secured to the valve ball 16 for rotation therewith, at the top of the valve ball and opposite to the journal plug 21 in axial alignment therewith. A corresponding vertical opening is provided in the valve housing 6, which provides a journal surface 28 for rotation of the valve stem. The valve stem extends into the valve cavity 7 and into a corresponding radial bore 31 at the top of the valve ball, so that the inner end 29 of the stem serves as a journal support for the valve ball. The valve ball thus is accurately located for turning and for bearing on the valve stem 27 and the journal plug 21.

The inner end 29 of the valve stem 27 is provided with a longitudinal slot 32 in which a key 33 projecting outwardly therefrom is secured by a fastening 34. The key also seats in a corresponding keyway or groove in the valve ball 16, so that the valve ball can move slightly in the direction of the axis of rotation, to preclude binding of the valve ball and provide accurate location of the ball relative to the sealing means. At the same time, the valve ball rotates together with the valve stem.

In order to provide the tight seal which is required, the surfaces defining the valve cavity 7 are especially contoured. The valve cavity is enlarged, preferably adjacent the inlet opening 8, to provide an annular groove 36 which receives a circular backing ring 37. When the backing ring is seated within the annular recess 36, its inner frustoconical surface 38 is substantially tangent to the spherical surface 18 of the valve ball except for a slight or minimum running clearance between the surfaces. A similar housing construction is provided adjacent the outlet opening 9. The backing ring surface 38 continues beyond the point of approximate tangency toward the flow passage intersection, so that the backing ring serves as a firm support for a ring seal 41. The seal is preferably a thin stiff flexible flat ring having a surface of deformable material secured in the housing 6 on the upstream face of the backing ring around and adjacent the inlet opening 8. The seal is generally planar when standing freely before installation and is annular in plan. When installed, the seal is clamped against the backing ring 37 by a closure plate 42 secured to the valve body 6 by fastenings 43. One or a plurality of very thin gaskets 44 may be interposed between the closure plate and the valve body, so that the degree of compression of the sealing ring 41 between the backing ring 37 and the closure plate can be accurately established. The sealing ring is slightly compressed and held very firmly in position with sufficient tightness to preclude leaking along either face thereof.

The sealing ring when unconfined has a free standing portion 46 projecting radially inwardly from the clamped portion thereof. When the seal is installed, it is arranged to have the portion 46 deform and press against the adjacent spherical surface 18 of the valve ball 16, the backing ring 37 precluding any extrusion of the sealing ring 41 into the space between the backing ring and the valve ball.

As the ring 41 is installed, it is moved or pressed axially toward the valve ball 16. The thickness and stiffness of the seal and its arrangement are such that the inner portion thereof is deformed substantially into a conical shape with only the inner downstream edge of the seal contacting the sphere. The seal thus abuts the upstream face of the valve ball in line contact therewith. The contact area may be somewhat enlarged by wear, or the edge may be machined or bevelled very slightly, to provide a narrow band contacting the ball face therearound. Nevertheless, the seal preferably is substantially in line contact with the ball face at the edge of the seal.

Under these conditions, the sealing ring exerts an initial bearing pressure on the valve ball, so that the valve is sealed in the absence of fluid pressure thereon. When fluid pressure is exerted upon the sealing ring, high unit loading is produced at the contact line of the seal and the valve ball. In the illustrative embodiment, the upstream surface of the inner seal portion 46 is exposed to the upstream pressure from the inlet opening 8, and the downstream surface of the seal portion is exposed to the downstream pressure at the outlet opening 9, in communications through the valve cavity 7. When the valve is closed, a very large pressure differential exists, producing a tight seal. The tight seal is desired for producing a drop tight valve under extreme temperature and pressure conditions. At the same time, however, the tight sealing engagement produces a large frictional load which makes the valve difficult to rotate from one position to another. The invention provides an actuator construction which effectively produces the necessary force.

The seal 41 preferably is constructed of hard and rigid, as distinguished from elastomeric, synthetic thermoplastic resin material, having sufficient flexibility for the construction and sufficient deformability for tightly conforming to the surface of the valve ball 16. Examples of preferred materials are polychlorotrifluoroethylene (Kel–F and Fluorothene), polytetrafluoroethylene (Teflon), and nylon. The preferred material is the polymer of chlorotrifluoroethylene, which is especially adapted for liquid oxygen valves. At the temperatures encountered, elastomers such as rubber harden and shatter. Nylon is not used in this application, as it will react violently with the oxygen and is not adapted for the low temperatures. However, it is excellent at higher temperatures and for nitrogen valves under high pressure, for example. The polymer of tetrafluoroethylene is subject to crushing and cold flow in liquid oxygen valves and therefore is not recommended; however, in other applications, it is employed successfully. In the latter case, and in other cases where desirable, the polymer may be reinforced by fabric or metal inserts, for example. Such materials are employed in the preferred combination of ball valve and actuator according to the invention. The actuator is also useful in other applications and with seals of different types. For example, the actuator may be employed with valves constructed with rubber sealing materials, where the conditions of use are not so strenuous and where the sealing means imposes a substantial frictional load.

A tubular valve bonnet or jacket 61 is mounted on the valve housing, around and concentric with the valve stem 27. The bonnet is secured on the housing by a removable threaded collar 62. The collar holds a locating ring 63 seated in a groove 64 in the housing, and it is also appropriately restrained against relative rotation on the housing. To preclude substantial leakage along and axially movement of the valve stem 27, the housing 6 is provided with an enlarged groove 66 at the top of the housing below the bonnet 61. An enlarged circumferential collar is provided on the valve stem 27, and the collar is located in the groove 66 of the housing. A packing ring 67 surrounds the collar in the groove 66, and the packing ring and valve stem collar are secured in position by a packing nut 69 around the valve stem and in threaded engagement with the valve housing 6 in the stem opening therein.

Means are provided which join the valve stem 27 to the bonnet 61 and prevent movement of the stem in the direction of its axis. The bonnet is provided with a pair of circumferential grooves 69 which are closed by a movable band 71. A cross shaft 72 extends diametrically through the valve stem and projects into the bonnet grooves 69. The outer ends of the shaft have indicator extensions 73 passing through appropriate holes in the band 71. Bearing wheels 74 are mounted adjacent the outer ends of the shaft 72, and they operate freely within the circumferential slots 69 in the bonnet. This construction permits rotation of the valve stem 27 through a quarter turn or 90 degrees, which is sufficient to operate the valve ball 16 while precluding any axial translation between the valve stem 27 and the valve housing 6.

A power cylinder 76 is mounted on the bonnet 61 integral therewith. A piston 77 is mounted for reciprocable movement in the cylinder, in the direction of the axis of the valve stem. A sleeve 78 is secured on the inner or lower end of the piston 77, integral therewith. The sleeve is tubular, and it is disposed within the bonnet and around the valve stem. A pair of helical openings 79 are formed in the sleeve, of substantially the configuration developed in FIGURE 7. The sleeve receives the cross shaft 72 in the helical grooves, for rotation of the valve stem by linear movement of the sleeve. In particular, additional bearings or rollers 81 are mounted on the cross shaft, between the outer bearings 74 and the valve stem, and they travel on the surfaces of the helical grooves 79. A key block 82 is firmly anchored within the bonnet 61, by means of fastenings 83, and it projects into a keyway 84 on the outer surface of the sleeve 78. The engagement of the key and keyway prevents the sleeve from rotating in the bonnet.

When the piston 77 reciprocates within the cylinder 76, the sleeve 78 moves in a straight line and rotates the valve stem 27 due to the interengagement of the helical openings 79 and the shaft bearings 81. The stem is prevented from moving axially by the interengagement of the outer shaft bearings and the circumferential grooves 69 in the bonnet. Thus, as rectilinear translation without rotation of the piston 77 occurs, there is rotation without translation of the valve stem 27.

A special form of power mechanism is utilized to reciprocate the piston. The piston 77 has a hollow interior chamber 91 which communicates through ports 92 and 93 with an annular chamber 94 between the piston and the inner wall of the cylinder 76. A packing ring 95 at the upper end of the bonnet 61 prevents leakage along the outer surface of the piston 77. The piston includes a piston head 96 carrying a peripheral packing ring 97 which precludes leakage between the piston head and the inner wall of the cylinder 76.

A check valve body 98 is mounted axially within the piston head 96, and confines a check valve ball 99. A check valve seat 101 is provided above the valve ball, and the ball is urged against the seat by a compression spring 102 beneath the ball. Flow past the check valve ball occurs through channels 103 in the piston head and a central port 104 in the check valve body at the working face of the piston head. A fluid supply conduit 106 is secured in the head 107 of the cylinder. The construction permits fluid flow from the upper working face of the piston head 96, to an opposite smaller face on the piston head closing the annular chamber 94 and in communication with the piston ports 92 and 93.

When the piston and cylinder means is operated on compressed nitrogen, the nitrogen is admitted through the conduit 106 to the working face of the piston head 96. The gas pressure opens the check valve 99, and the interior of the piston 77 and the annulus 94 therearound are filled with compressed nitrogen. The gas in the annulus 94 urges the piston head 96 upwardly, but this force is overcome by the superior force due to the gas pressure exerted on the larger upper working face of the piston head. Consequently, the piston 77 is moved downwardly in the direction of the arrow in FIGURE 2. As the piston moves in this direction, the gas within the chamber 91 and the surrounding annulus 94 is compressed. When the piston is to be moved in the opposite direction, to change the position of the valve ball 16 in the valve housing 6, the pressure within the cylinder supply conduit 106 is dropped, e.g. to atmospheric pressure, thereby exhausting the space within the cylinder 76 above the piston head 96. The compressed gas acting upon the annular lower face of the piston head 96 then returns the piston 77 to its original position. Thereafter, introduction of compressed gas through the supply conduit 106 again moves the piston 77 in the direction of the arrow in FIGURE 2, and the cycle is repeated. The provision of the chamber 91 within the piston 77 increases the amount of compressed gas available for the return or upward stroke of the piston, preventing an excessively rapid drop in the pressure of the confined gas which serves to return the piston. The gas in the cylinder 76 below the piston head 96 may be released by removing a plug 111 in the side of the cylinder, as is necessary in dismantling the apparatus.

It will be apparent that various changes and modifications can be made in the construction and arrangement of parts without departing from the spirit and scope of the invention. It is intended that such changes and modifications be included within the scope of the appended claims.

What I claim as new and desire to secure by Letters Patent of the United States is:

1. A valve actuator which comprises a rotatable valve stem, a jacket around said valve stem, shaft means joining said stem to said jacket, said valve stem and said shaft means having cooperating means for preventing relative movement of the two in the direction of the stem axis, said cooperating means accommodating rotation of said stem relative to said jacket, tubular helical drive means in said jacket and around said valve stem, said drive means being reciprocably movable in the direction of said stem axis, said drive means engaging said shaft means for rotation of said shaft means and said stem by movement of the drive means, and piston and cylinder means connected to said drive means for moving the latter.

2. An actuator as defined in claim 1 wherein said jacket and said cylinder means are integral, and said drive means and said piston means are integral.

3. An actuator as defined in claim 2 including check valve means between a working face on said piston means and a smaller face thereon opposite said working face, said check valve means being constructed and arranged to open when fluid pressure is applied to the working face to accommodate fluid flow from said working face to said opposite face.

4. A valve actuator which comprises a rotatable valve stem, a valve bonnet around said valve stem, means defining circumferential grooves in said bonnet, said grooves lying generally in a plane transverse to the valve stem axis, a shaft connected to said stem and extending in said grooves, said shaft and grooves cooperating for preventing movement of said stem in the direction of its axis relative to said bonnet and for accommodating rotation of the stem relative to the bonnet, a sleeve having a helical groove in said bonnet and around said valve stem, said sleeve being reciprocably movable in the direction of said stem axis, said sleeve groove receiving said shaft for rotation of said stem by movement of the sleeve, a piston connected to said sleeve, and a cylinder around said piston and connected to said bonnet.

5. For use with a ball valve comprising a valve housing having aligned inlet and outlet openings and a stem opening at right angles thereto, a rotatable valve stem extending through said stem opening, a valve ball in said housing and connected to said valve stem for rotation therewith, means forming a flow passage in said valve ball adapted to be rotated into and out of alignment with said inlet and outlet openings for opening and closing the valve, a ring seal having a surface of deformable material secured in said housing, means forming a circular opening in said seal having a diameter greater than said flow passage and adapted for receiving said valve ball in sealing engagement therewith, the improvement comprising a valve bonnet on said housing around said valve stem, means joining said stem to said bonnet, circumferential groove means in said bonnet cooperating with said joining means for preventing movement of the stem in the direction of its axis and for accommodating rotation of said stem, helical drive means reciprocably movable in the direction of said stem axis, said drive means engaging said stem for rotation thereof by movement of the drive means, and piston and cylinder means mounted on said bonnet and connected to said drive means for moving the latter.

References Cited in the file of this patent
UNITED STATES PATENTS

| | | |
|---|---|---|
| 2,516,947 | Blevins | Aug. 1, 1950 |
| 2,883,144 | Kendig | Apr. 21, 1959 |
| 2,974,646 | Miller | Mar. 14, 1961 |
| 2,998,805 | Usab | Sept. 5, 1961 |